United States Patent [19]

Hayashi et al.

[11] Patent Number: 5,239,484
[45] Date of Patent: Aug. 24, 1993

[54] AUTOMATIC SYNTHESIS APPARATUS

[75] Inventors: Nobuyoshi Hayashi, Kawanishi; Tohru Sugawara, Osaka, both of Japan

[73] Assignee: Takeda Chemical Industries, Ltd., Osaka, Japan

[21] Appl. No.: 960,258

[22] Filed: Oct. 13, 1992

Related U.S. Application Data

[63] Continuation of Ser. No. 774,631, Oct. 8, 1991, abandoned, which is a continuation of Ser. No. 328,611, Mar. 27, 1989, abandoned.

[30] Foreign Application Priority Data

Mar. 31, 1988 [JP] Japan .................................. 63-79104

[51] Int. Cl.$^5$ .............................................. G06F 15/46
[52] U.S. Cl. .................................... 364/500; 364/496; 364/502
[58] Field of Search ............... 364/500, 502, 496, 148, 364/152, 166, 479, 468; 73/61.41

[56] References Cited

U.S. PATENT DOCUMENTS

| | | | |
|---|---|---|---|
| 4,208,712 | 6/1980 | Deutsch | 364/500 |
| 4,469,146 | 9/1984 | Campbell et al. | 364/502 |
| 4,589,072 | 5/1986 | Arimatsu | 364/500 |
| 4,633,413 | 12/1986 | Caveney et al. | 364/500 |
| 4,648,043 | 3/1987 | O'Leary | 364/502 |
| 4,654,801 | 3/1987 | Stewart et al. | 364/500 |
| 4,668,476 | 5/1987 | Bridgham et al. | 364/500 |
| 4,742,472 | 5/1988 | Sugimori et al. | 364/500 |
| 4,744,037 | 5/1988 | Niina et al. | 364/500 |
| 4,754,410 | 6/1988 | Leech et al. | 364/148 |
| 4,825,353 | 4/1989 | Jenkins | 364/152 |
| 4,835,707 | 5/1989 | Amano et al. | 364/500 |

Primary Examiner—Kevin J. Teska
Attorney, Agent, or Firm—McGlew and Tuttle

[57] ABSTRACT

A computerized compound synthesization for producing an aimed product by controlling a synthesis reaction process including steps of supplying raw material compounds, reagents and solvents, a synthesis reaction step, a purification step and a product extraction step in accordance with a control program. Optimal condition for the reaction is established by determining discrete time points at which the reagent is added and volumes of the reagent to be added at the time points, respectively, on the basis of parameters including reaction rate constant, equilibrium, constant, initial concentration of starting material mixture, ratio of concentration of intermediate product to theoretical equilibrium concentration, stoichiometrical ratio between the reagent and the intermediate and concentration of the reagent in accordance with a relation established among these parameters.

11 Claims, 10 Drawing Sheets

| TIME(Tn) | STEP | MEASUREMENT/ CONTROL | CALCULATION/ DECISION |
|---|---|---|---|
| $T_0$ | SUPPLY OF RAW MATERIALS | G-L SENSOR | CALCULATION OF OPTIMUM REACTION CONDITIONS / QUANTITATIVE DECISION |
| $T_1$ | 1ST STAGE OF REACTION | | |
| | ADDITION OF REAGENT | $t_i/V_i$-CONTROL / G-L SENSOR | QUANTITATIVE DECISION |
| $T_2$ | TRANSFER OF REACTANT LIQUID | | |
| $T_3$ | CONCENTRATION OF REACTANT LIQUID | CONCENTRATION SENSOR | DECISION FOR CONCENTRATION |
| $T_4$ | 2ND STAGE OF REACTION | | |
| | ADDITION OF REAGENT | G-L SENSOR | QUANTITATIVE DECISION |
| $T_5$ | CONCENTRATION OF REACTANT LIQUID | CONCENTRATION SENSOR | DECISION FOR CONCENTRATION |
| | ADDITION OF REAGENT | G-L SENSOR | QUANTITATIVE DECISION |
| $T_6$ | TRANSFER OF REACTANT LIQUID | | |
| $T_7$ | EXTRACTION OF SOLVENT | L-L SENSOR | DECISION FOR LIQUID-LIQUID BOUNDARY |
| $T_8$ | ADJUSTMENT OF LIQUID PROPERTIES | pH-ELECTRODE WITH DROPPING OF ACID/ALKALI | DECISION FOR pH |
| $T_9$ | INJECTION TO PURIFYING SYSTEM | CONCENTRATION SENSOR / G-L SENSOR | DECISION FOR PURITY, YIELD, QUANTITY, CONCENTRATION OF PRODUCT |
| $T_{10}$ | ACQUISITION OF PRODUCT | EFFLUENT COMPONENT PEAK MEASUREMENT AND SEPARATION | DECISION FOR ACQUISITION |
| $T_{11}$ | FREEZE-DRY OR CONCENTRATION | | |
| $T_{12}$ | WASH/DRY OF APPARATUS | | DECISION ABOUT NEED FOR WASHING |
| $T_{13}$ | | | DECISION FOR END/REPETION |

AUTOMATIC SYNTHESIS APPARATUS

This is a file wrapper continuation of application Ser. No. 07/774,631 filed Oct. 8, 1991 which is a file wrapper continuation of application Ser. No. 07/328,611 filed Mar. 27, 1989, both abandoned.

BACKGROUND OF THE INVENTION

1. Field of the Invention

The present invention relates in general to a method and a system for automated synthesis of chemical products. More particularly, the present invention is concerned with an automated synthesis method and system which can automatically establish the optimum conditions for a synthesis reaction for producing a given chemical product to thereby control the synthesis reaction process such that the optimum reaction conditions can be realized.

2. Description of the Related Art

Heretofore, the synthesis of chemical products has been carried out through manual operations by an operator on the basis of empirically obtained knowledge and rules. By way of example, when an aimed chemical product is to be produced through the conventional synthesis procedure by adding a reagent to a reaction phase in which raw material compounds are in equilibrium with intermediate products to thereby cause the reagent to react with an intermediate product, the rate of addition of the reagent is usually determined by an operator intuitively on the basis of his or her experience, wherein such a control method is commonly adopted in which a predetermined amount of reagent is added successively at predetermined time intervals by taking into account the amount of supply of the raw material (starting) compounds. Consequently, enormous labor and time consumption are involved, in particular when a batch of different syntheses have to be dealt with. Besides, great difficulty has been encountered in attaining the desired purity and yield of the aimed or final product, not to speak of uniformity in the quality of the product.

Figure 6:
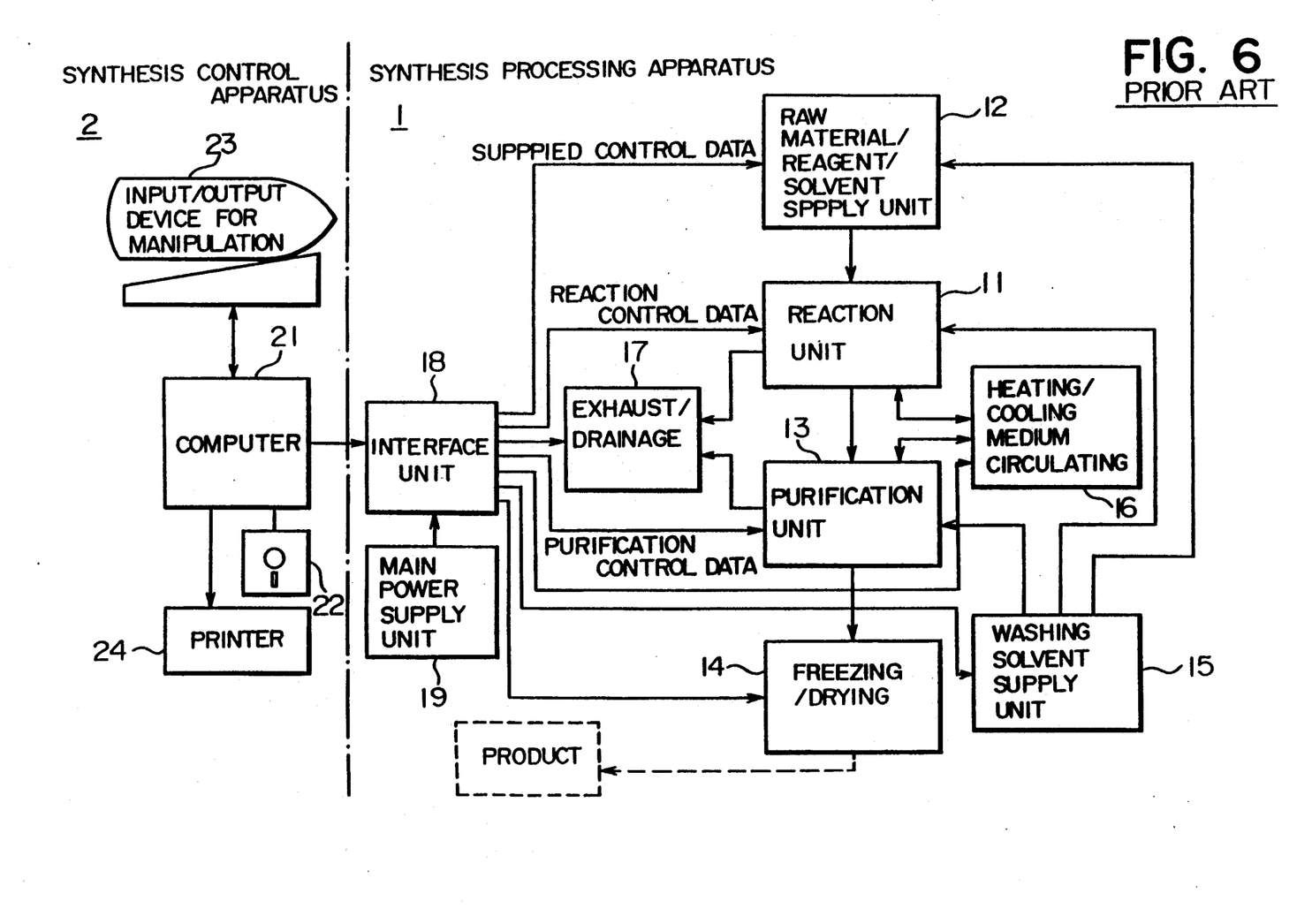
FIG. 6 is a view showing a structure of an automated synthesis apparatus according to the precedent proposal.

For dealing with the problems mentioned above, there has already been proposed such an automated compound synthesizing system as shown in FIG. 6 of the accompanying drawings. This prior art system will briefly be described below.

Referring to FIG. 6, the automated synthesis system illustrated is composed of a synthesis processing apparatus 1 and a synthesis control apparatus 2, wherein the synthesis processing apparatus 1 is so arranged as to perform a series of process steps required for synthesizing an aimed product from the raw material (starting) compounds, while the synthesis control apparatus 2 serves to prepare the control information for controlling the operations of the synthesis processing apparatus 1 and at the same time supervise the states prevailing within the synthesis processing apparatus 1 for thereby reflecting the detected states onto the control.

The synthesis processing apparatus 1 comprises a reaction unit 11 for carrying out a synthesis reaction process, a raw material/reagent solvent supply unit 12 for supplying raw or starting materials, a reagent and a solvent to the reaction unit 11, a purification unit 13 for purifying a product resulting from the synthesis reaction process performed by the reaction unit 11, a freezing/drying unit 14 for lyophilizing the product purified by the purification unit 13, a washing solvent supply unit 15 for supplying a solvent for washing flow lines of the reaction unit 13 and the raw material/reagent/solvent supply unit 12, as occasion requires, a heating/cooling medium circulating unit 16 for heating or cooling the reaction unit 11 and the purification unit 13, an exhaust/drainage unit 17 for exhausting and draining the reaction unit 11 and the purification unit 13, an interface unit 18, and an electric power supply unit 19.

On the other hand, the synthesis control apparatus 2 comprises a computer or central processing unit (CPU) 21 for generating the control information for controlling sequentially the abovementioned individual units of the synthesis processing apparatus 1 in accordance with predetermined procedure and sequence, fetching various state signals detected by Sensors installed at the individual units of the synthesis processing apparatus 1 and executing a processing for reflecting the detected states onto the control, a memory device 22 connected to the CPU 21 for storing therein control programs, data and others, an operator input/output apparatus 23 including a keyboard and a cathode ray tube (CRT) display, and a hard copy printer 24.

The efficiency at which the aimed product is synthesized within the reaction unit 11 of the synthesis processing apparatus 1, i.e. the ratio of the amount of the product to the time required for the synthesis depends on the amount of the reagent as added and the rate of the addition, because the raw materials and the intermediate products are in the equilibrium state. In the automated synthesis system described above, however, the control information concerning the amount of addition of the reagent required for the control of the synthesis reaction has to be previously prepared logically through manual procedure and loaded in the synthesis control apparatus Z in the form of the control program and the control data. Further, the control information must be prepared separately for each of the formulae of chemical reactions involved in the synthesis, i.e. for each of different combinations of the raw material compounds, reagents and the aimed products.

As will be seen from the foregoing, the automated synthesis system described above also suffers from problems. First, the control information for controlling the synthesis reaction has to be created for each of the chemical reactions for synthesis. Further, in order to prepare such control information for the optimum reaction conditions which allows the synthesis reaction to take place at the maximum efficiency, retrieval of a data base including an accumulation of data obtained through lots of experiences is required, which means that the preparation of the control information is attended with a significant time consumption and a great burden to the operator Under the circumstances, it has been a common practice to prepare the control information rather intuitively by relying on the empirically acquired knowledge.

SUMMARY OF THE INVENTION

It is therefore an object of the present invention to provide an automated compound synthesizing method which can avoid the shortcomings of the prior techniques mentioned above and which makes it possible to prepare automatically the control information capable of realizing the optimum conditions for a given chemical reaction for thereby allowing the synthesis reaction process to be automatically performed in accordance with the control information.

It is another object of the present invention to provide an automated synthesis system for carrying out the method mentioned above.

A further object of the present invention is to provide an automated synthesis system which is adapted to produce an aimed product by adding a reagent to a reaction phase including raw material compounds and intermediates in the equilibrium state to thereby cause the reagent to react with the intermediate, and which system controls the volume of the reagent to be added as well as the rate of addition with the aid of a computer for thereby producing the aimed product of high purity with an improved yield.

It is still another object of the present invention to provide an automated synthesis system of versatile nature which can automatically perform a wide variety of synthesis reactions.

The present invention starts from the recognition that physical relations which can be defined by predetermined equations exist among a reaction rate constant ($k_1$) and an equilibrium constant ($K = k_1/k_{-1}$) of a given chemical reaction formula the concentration of a reagent (R), other synthesis conditions such as the initial concentration of a raw material mixture (A + B), a volume thereof and others, and a time for addition of the reagent (R) and a volume thereof for the optimum conditions for reaction. The invention proposes determining arithmetically the time for addition of the reagent and the volume thereof to be added for thereby preparing the control information required for realizing the optimum synthesis conditions by taking into account the addition time and the added volume of the reagent as determined.

In view of the above and other objects which will be more apparent as description proceeds, there is proposed according to an aspect of the present invention an automatic compound synthesizing method for producing an aimed product by controlling a series of synthesis process steps including a supply step of raw material compounds, a reagent and a solvent, a synthesis reaction step, a purification step and a fractional extraction (fractionation) of the aimed product in accordance with control information, wherein the control information for allowing the synthesis reaction to he performed under the optimum conditions for the synthesis reaction is automatically prepared on the basis of parameters such as a reaction rate constant, an equilibrium constant and other factors involved in the synthesis reaction by taking into account predetermined relations which exist among the abovementioned parameters, the time for addition of the reagent and the amount thereof.

According to another aspect of the present invention, there is provided an automated synthesis system which comprises a synthesis processing apparatus for controlling a series of synthesis process steps including supply of raw material compounds, reagent and solvent, synthesis reaction, purification and fractional extraction of a product in accordance with control information to thereby produce an aimed product, and a synthesis control apparatus for generating control information required for controlling the synthesis process steps in the synthesis processing apparatus, wherein the synthesis control apparatus includes means for generating the control information capable of realizing the synthesis reaction under the optimum conditions for the reaction on the basis of a reaction rate constant, an equilibrium constant and others involved in the synthesis reaction and supplying the control information to the synthesis processing apparatus, and wherein the control information for realizing the synthesis reaction under the optimum conditions for the reaction includes information concerning a series of time points at which the reagent is to be added and volumes of the reagent to be added at the time points, respectively.

In a preferred embodiment of the present invention, it is taught that when the reaction rate constant and the equilibrium constant are unknown in a given chemical reaction formula, they are calculated from a substituent constant and a reaction constant, whereby the control information required for the synthesis reaction is arithmetically determined by making use of the calculated reaction rate constant and the calculated equilibrium constant. In the case of the reaction of keto acid with amino acid, by way of example, expressions for the calculations may be such as mentioned below.

$$K = 0.47 \exp(1.414 \times Ex)$$

$$k_1 = 9.57 \exp(6.0 \times Es)$$

where Es represents the substituent constant.

The above and other objects as well as advantageous features and effects of the present invention will be more apparent upon consideration of the following description of the preferred and exemplary embodiments thereof taken, by way of example only, in conjunction with the accompanying drawings.

BRIEF DESCRIPTION OF THE DRAWINGS

FIGS. 5(A) to 5(E) are flow charts illustrating routines incorporated in the control program shown in FIG. 4, in which:

DESCRIPTION OF THE PREFERRED EMBODIMENTS

Figure 1:
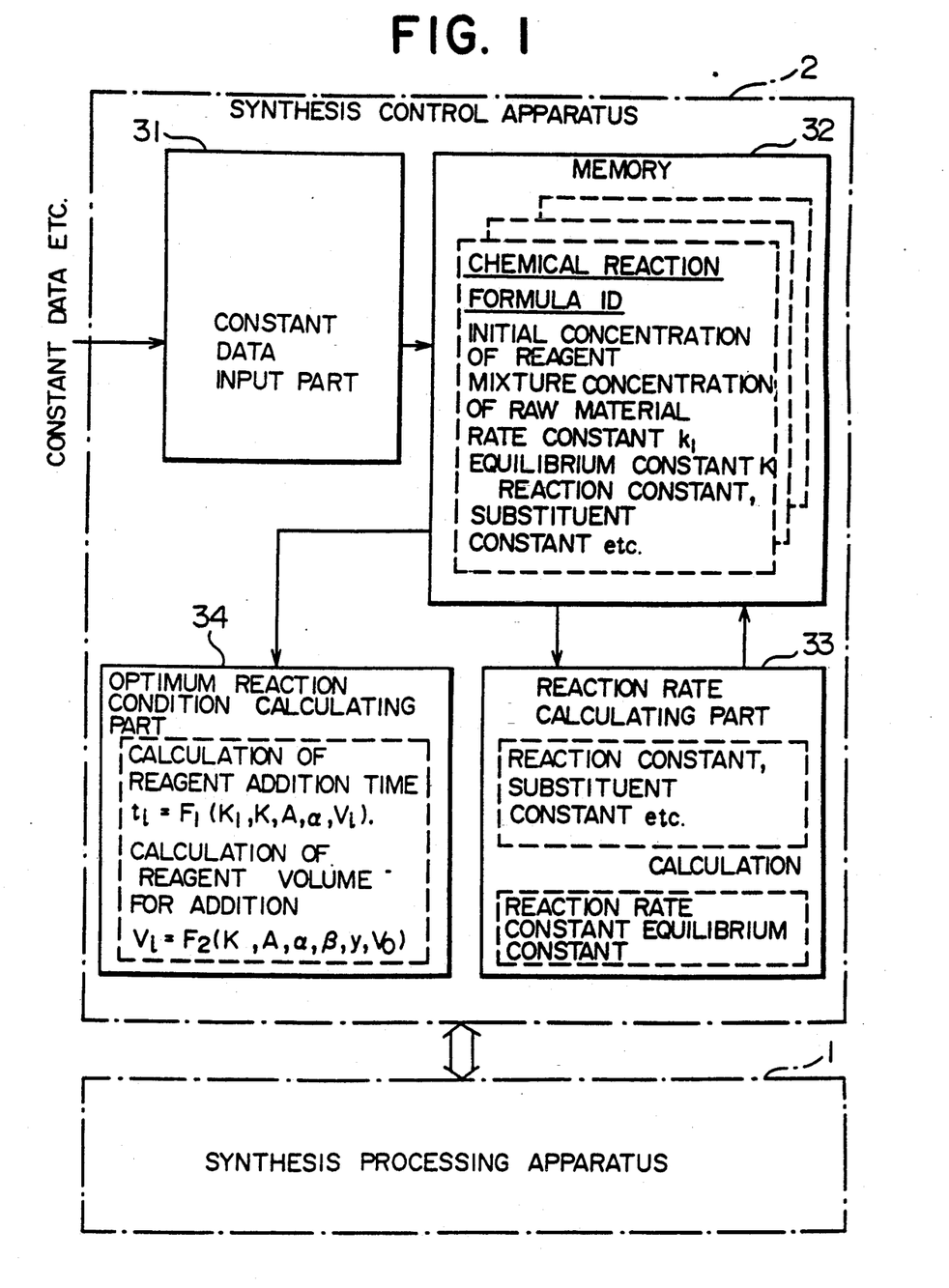
FIG. 1 is a schematic block diagram for illustrating the principle underlying the present invention.

Before entering into detailed description of the exemplary embodiments of the present invention, the principle underlying the invention will first be elucidated by reference to FIG. 1.

In FIG. 1, a reference numeral 1 denotes a synthesis processing apparatus for performing a series of synthesis process steps such as charging of raw materials, a reagent and a solvent, reaction for the synthesis, purification and fractional extraction of the product. A reference numeral 2 denotes a synthesis control apparatus constituted by a computer for automatically preparing and supplying the control information required for the synthesis processing apparatus 1 to execute the series of synthesis process steps. The addition time of the reagent and the addition volume among others are arithmetically determined so that the optimum conditions for the intended synthesis reaction can be realized. A reference numeral 31 denotes a physical constant data input part for inputting constant data such as concentration data of the raw material compounds and the reagent which participates in the reaction for synthesis, a reaction-rate constant, an equilibrium constant, a substituent constant and others which are relevant to the synthesis reaction. A reference numeral 32 denotes a memory equipment for storing the abovementioned constant data inputted by way of the constant data input unit 31. A reference numeral 33 denotes a reaction rate calculating part for determining are unknown reaction-rate constant and are unknown equilibrium constant from a physical constant such as the substituent constant, in case a given chemical reaction formula is lacking in the reaction rate constant and the equilibrium constant. A reference numeral 34 denotes an optimum reaction condition calculating part which reads out the constant data such as the initial concentration of the raw material mixture, the concentration of the reagent, the reaction rate constant, the equilibrium constant and others for a designated chemical reaction formula from the memory equipment 32 for thereby calculating the time for addition of the reagent and the volume thereof so that the optimal conditions for the synthesis reaction defined by the formula can be realized, wherein the results of the calculation are supplied to the synthesis processing apparatus 1 in the form of the control information.

In the operation of the conceptual synthesis system of the present invention shown in FIG. 1, the synthesis control apparatus 2 receives as the parameter information indicating chemistry characteristics of the synthesis reaction to be controlled, the reaction rate constant $k_1$, the equilibrium constant $K$ $(=k_1/k_{-1})$ or the reaction constant and the substituent constant inputted through the constant data input part 31 and stores the parameter information in the memory equipment 32. The memory equipment 32 stores therein the constant data in correspondence relation with ID (e.g. identification symbol) attached to each of the chemical reaction formulae so that these constant data can readily be read out in an arbitrary manner. The reaction rate calculating part 33 serves to supplement the reaction rate constant $k_1$ and the equilibrium constant $K$ for a chemical reaction formula designated for the control, unless these constant data are available from the memory, by determining them on the basis of the reaction constant and the substituent constant. The optimum reaction condition calculating part 34 calculates the reaction rate constant $k_1$ and the equilibrium constant $K$ as well as the initial concentration of the raw material mixture, the time $t_i$ for addition of the reagent and the volume $V_i$ of the reagent to be added for a chemical reaction formula designated for the processing.

The time $t_i$ (i=1,2, ... ) for addition of the reagent means a reaction time intervening between the sequential additions of the reagent, wherein $t_0$, for example, represents a reaction time duration up to a time point $t_1$ at which the reagent is first to be added, and so forth. Accordingly, the total reaction time $T$ is given by the following expression:

$$T = t_0 + \sum_{i=1}^{n} t_i \tag{1}$$

Further, the symbol $V_i$ represents the volume of the reagent to be added at each of the time points $t_i$. Accordingly, the total volume $V_t$ of the agent to be added can be expressed as follows:

$$V_t = \sum_{i=1}^{n} V_i \tag{2}$$

In the above expressions (1) and (2), $t_0$, $t_1$ and $V_i$ are given respectively, by the following equations:

$$t_0 = \frac{\sqrt{K}}{2Ak_1} \ln \frac{1}{1+\sqrt{K}} \left( \frac{1+\alpha}{1-\alpha} + \sqrt{K} \right) \tag{3}$$

$$t_i = \frac{\sqrt{K}}{2Ak_1} \left( \frac{1+\sqrt{K}}{1+(1-\alpha)\sqrt{K}} \right)^i \tag{4}$$

$$\left(1 + \frac{\sum_{i=1}^{n} V_i}{V_0}\right) \ln \frac{1}{1+\sqrt{K}} \left( \frac{1+\alpha}{1-\alpha} + \sqrt{K} \right)$$

$$V_i = \frac{\beta A V_0}{y} \left( \frac{\alpha \sqrt{K}}{1+\sqrt{K}} \right) \left( 1 - \frac{\alpha \sqrt{K}}{1+\sqrt{K}} \right)^{i-1} \tag{5}$$

where the symbols used in the expressions (3) to (5) have the counts as follows:

$k_1$: reaction rate constant (in forward direction),
$K$: equilibrium constant,
$A$: initial concentration of raw material mixture,
$\alpha$: ratio of concentration of intermediates as produced to theoretical equilibrium concentration,
$\beta$: stoichiometrical ratio between the reagent and the intermediate, and
$y$: concentration of the reagent.

Figure 2:
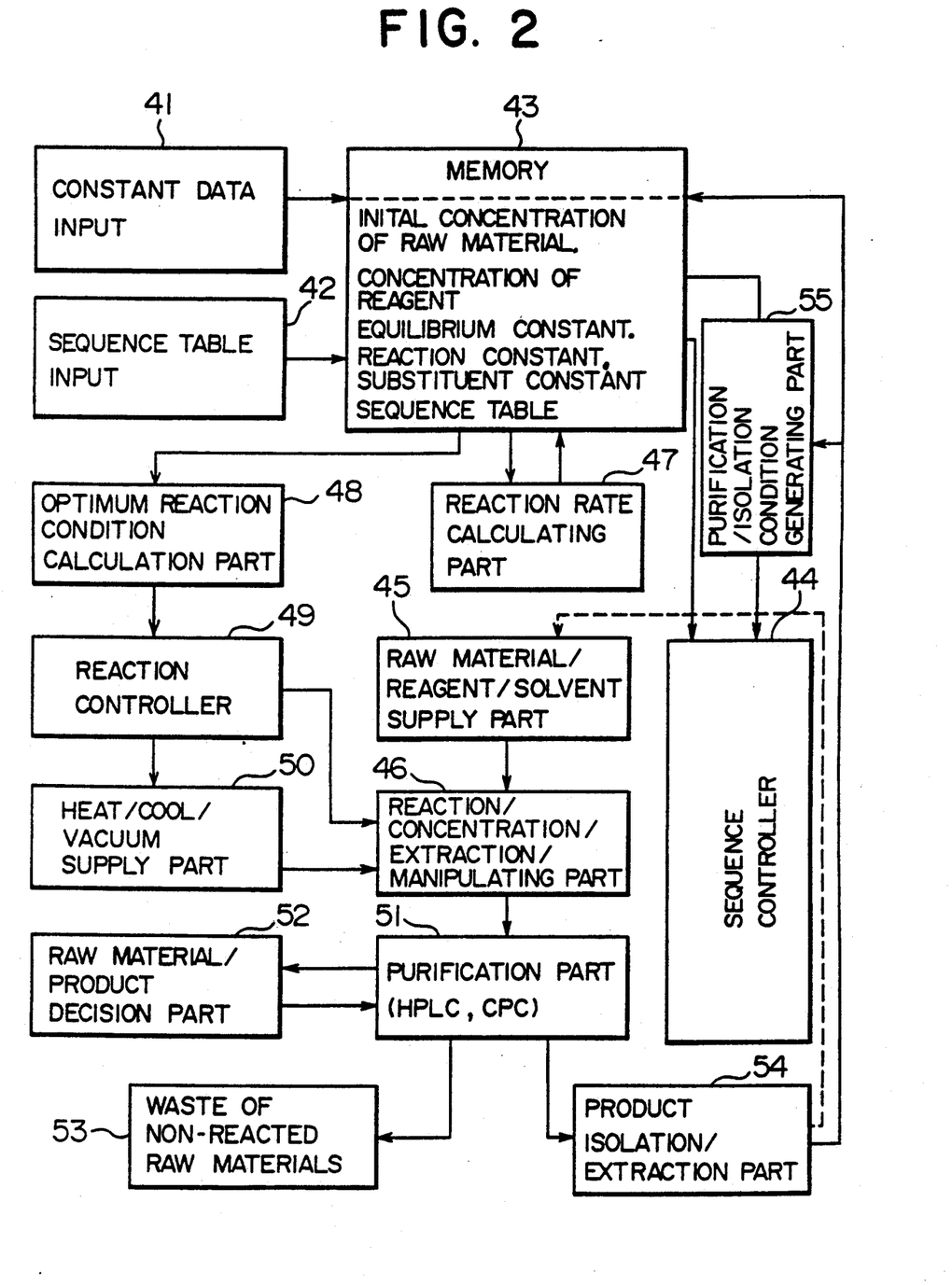
FIG. 2 is a functional block diagram showing a general arrangement of an automated compound synthesizing system according to an exemplary embodiment of the present invention.

Now, an exemplary embodiment of the present invention will be described in detail. FIG. 2 shows in a block diagram an arrangement of the automated synthesis system for performing a series of synthesis process steps including the supply of raw materials, reagents and solvents, the synthesis reaction, purification and fractional extraction of a product in an automated manner. In the following, individual functional parts will be elucidated in the order of the reference numerals attached thereto for convenience of description. Parenthetically, interconnection of the various parts will be readily understood from the figure.

Constant Data Input Part 41

Desired data such as the concentrations of raw materials and reagents, a reaction constant relevant to the synthesis reaction of concern, physical constants such as a substituent constant and others, purity of the reaction product, the minimum yield to be attained at the least are inputted by way of this data input part 41.

Sequence Table Input Part 42

A sequence table containing the control procedure for the whole synthesis process and a series of commands designating individual control conditions is inputted through this sequence table input part 42. Further, the names of raw materials, reagents and solvents are inputted in association with the identification numbers allocated to the respective reservoirs.

Memory Equipment 43

Figure 3:
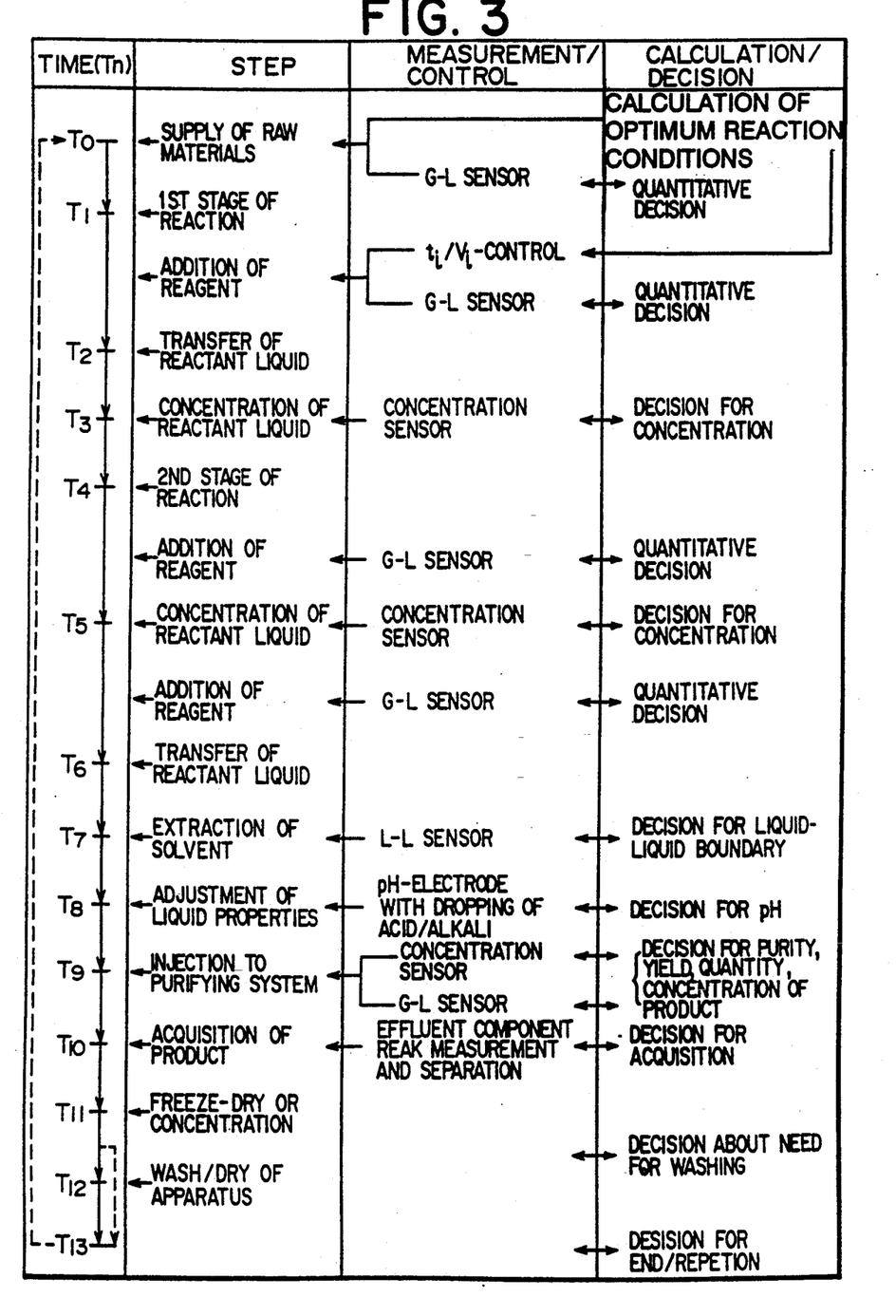
FIG. 3 is a sequence chart or table showing, by way of example only, timing relations among process steps in an automated compound synthesis, detections of status quantities prevailing in the synthesis process and control procedure steps.

The memory equipment 43 is constituted by a RAM (random access memory) backed up by an auxiliary storage device such as a floppy disk device or the like and serves for storing the various input parameters such as the initial concentration of a raw material mixture, the concentration of reagent, the reaction constant, the substituent constant and others as well as the sequence table for making them available for utilization, as occasion requires. An example of the sequence table is shown in FIG. 3 in the form of a sequence/timing chart.

Sequence Controller 44

This sequence controller 44 executes the control procedure and the individual controls designated in the sequence table (FIG. 3) to thereby issue corresponding operation commands.

When entry of the raw material/reagent names corresponding to the identification number of the associated reservoir is absent in the sequence table input part 42, the relevant supply step is jumped over to execute a succeeding operation. Combination of the raw materials for reaction and the order therefor are fetched in the sequence table. In case entry of the concentration is absent, the relevant operation in the sequence table is skipped. Unless extraction of the solvent and adjustment of pH are required, a liquid transfer (or transportation) process is executed.

Selection of HPLC (high performance liquid chromatography), CPC (centrifugal partition chromatography) and the developing solvent is realized by issuing a corresponding valve switching instruction in accordance with the command. Volumetric measurement, concentration and extraction of the solvent and injection of the reactant mixture into the purification system are executed under control at succeeding sequence steps in response to signals outputted from a G-L (gas-liquid boundary detecting) sensor, a L-L (liquid-liquid boundary detecting) sensor, a concentration sensor and others.

Raw Material/Reagent/Solvent Supply Part 45

In response to the signal issued from the sequence controller 44, the amount of a solution of the raw materials is measured with the aid of the signal from the G-L sensor while controlling the corresponding valve on/off operation, the measured solution being then introduced to a synthesis reaction flask or unit.

Reaction/Concentration/Extraction Manipulation Part 46

Operations for the reaction, the concentration and the extraction are activated in response to the signals from the sequence controller 44 and a reaction controller 49 (described hereinafter).

Reaction Rate Calculating Part 47

Upon input of the reaction rate constants ($k_1$) and the equilibrium constants ($K = K_1/k_{-1}$) for a product corresponding to several substituent constants in the following chemical reaction formula the physical constants such as the reaction constants and others are arithmetically determined to be stored in the memory equipment 43. On the basis of these physical constants stored in the memory equipment 43, the constants $k_1$ and $K$ corresponding to a number of the substituent constants are calculated through reverse procedure to be subsequently stored in the memory equipment 43.

Optimum Reaction Condition Calculation Part 48

Concentration of the reagent (R) for the reaction and the initial concentration and volume of the raw material mixture are read out together with the constants $k_1$ and $K$ from the memory equipment 43, whereon the time for addition and the volume of the reagent (R) to be added in the undermentioned succeeding reaction phase are calculated.

Reaction Controller 49

This reaction controller 49 regulates the reagent addition rate by adjusting the opening degree of the corresponding valve by driving with a pulse-like current.

For the concentration and the extraction, the execution command is issued on the basis of the results of detection outputs of the concentration sensor and the L-L sensor. However, in the case of a reaction which does not require such an execution command, the processing is jumped to a next sequence step.

Heat/Cool/Vacuum Supply Part 50

A heating medium or a coolant is circulated through a jacket tube of the reaction flask for the heating or cooling thereof.

In response to a signal commanding the concentration or a signal commanding transfer of the solution, the associated valves are opened or closed with a vacuum pump being driven.

Purification Part 51

The purification part includes the HPLC, CPC, concentrating means and a buffer solution adjusting system, wherein selection of the HPLC or CPC or operation of them in the serial connection is rendered possible.

Raw Material/Product Decision Part 52

Peaks of the effluent components are detected with the aid of HPLC or CPC, wherein those components exhibiting the peaks having a same duration as the retention time of the raw materials are introduced to a non-reacted raw material wastage reservoir 53 (described hereinafter).

The peak measured for the product is utilized for arithmetically determining the purity and yield of the product by taking into consideration magnitude of the peak or the relation between the magnitude of the peak and the retention time in case another peak makes appearance in the vicinity of the former.

When the purity and the yield has exceeded the respective desired values, the product fraction of concern is introduced to a product isolation/fractionation part 54 (described hereinafter). On the other hand, when the purity is lower than the desired value, a signal commanding re-purification is issued to the purification part 51.

When the yield is lower than an expected value, the product fraction is introduced to the fractional extraction part and at the same time a re-synthesis operation start command is issued to the memory equipment 43.

Non-reacted Raw Material Waste Part 53

The raw material fraction as identified by the raw material/product identification part 52 and the washing solution for the associated flow lines are all introduced into a reservoir for wastage.

Product Isolation/Fractionation Part 54

The product fractions are introduced into concentrate reservoirs provided for every products and lyophilized.

Purification/Isolation Condition Generating Part 55

On the basis of the retention time of the given raw materials, the purity and the minimum yield to be assured for the product and the result of the production, the conditions for controlling the purification and isolation are determined to thereby generate appropriate control information.

FIG. 3 shows an example of the sequence table utilized in the apparatus according to the illustrated embodiment of the present invention.

In this sequence, it is assumed that reaction of solutions given by the general formula mentioned below is performed.

More specifically, a plurality of raw materials A and B or A, B and C are added with D for reaction to thereby produce an intermediate X (reaction at the first stage), being followed by processing of the intermediate by adding F and G (at the second stage), whereupon Y as derived is added with H and J for further reaction to thereby produce an end product P (at the third stage). The additives D, F, G, H and J may be a reagent, a catalyst or a solvent. The product derived at each stage may be concentrated at a normal or a reduced pressure, wherein the intermediate remaining within the flask may be caused to react with the reagent added thereto.

In FIG. 3, "TIME $(T_n)$" represents a timing for the control, and "STEP" means individual steps included in the synthesis reaction processing. Further, "MEASUREMENT/CONTROL" represents the content of measurement or control effected at each "STEP". Similarly "CALCULATION/DECISION" represents contents of the corresponding calculation/decision steps.

Figure 4:
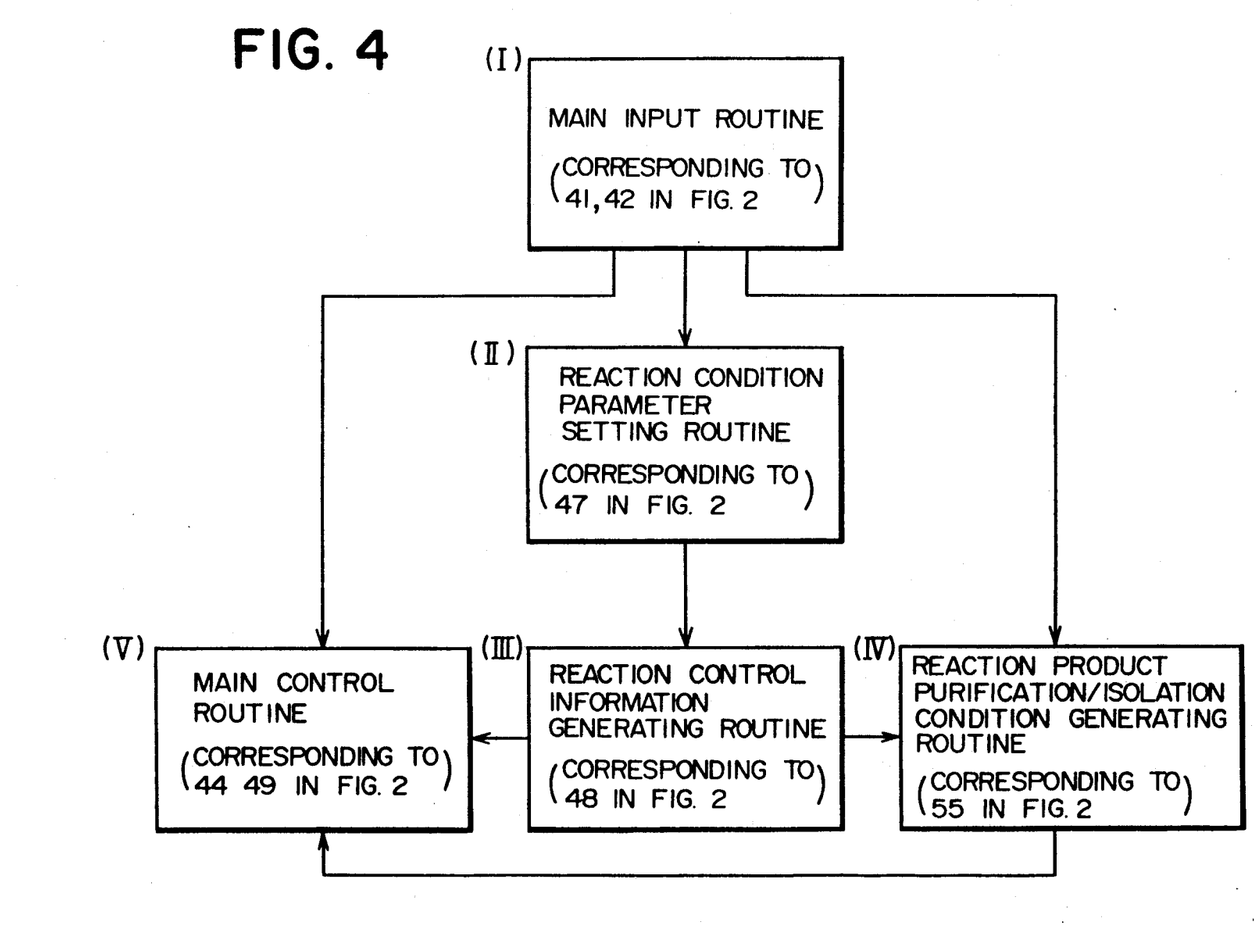
FIG. 4 is a flow chart showing schematically a basic structure of a control program according to an embodiment of the invention.

FIG. 4 shows a structure of the control program for the embodiment shown in FIG. 2. Referring to FIG. 4, a main input routine (I) is provided for inputting various data designating the conditions for the synthesis process and thus implements the functions of the constant data input part 41 and the sequence table input part 42 shown in FIG. 2. A reaction condition parameter setting routine (II) is provided for calculating and setting the reaction rate constant $k_1$ and the equilibrium constant K and others used as the reaction condition parameters for the intended synthesis reaction given by a formula and thus realizes the function of the reaction rate calculation part 47 shown in FIG. 2. A reaction control information generating routine (III) is provided for calculating the reagent addition time $t_i$ and the volume $V_i$ of the reagent to be added to thereby generate the control information for the addition of the reagent and thus realizes the function of the optimum reaction condition calculation part 48 shown in FIG. 2. A reaction product purification/isolation condition generating routine (IV) is provided for generating the control information for the purification and the isolation in dependence on the desired values of purity and yield of the product derived as the result of the synthesis reaction and thus realizes the function of the purification/isolation condition generating part 55 shown in FIG. 2. A main control routine (V) serves to control the synthesis processing apparatus on the basis of the control information established or generated through the routines (1) to (IV).

Next, flows of the individual routines (I) to (V) will be explained in more detail by reference to FIGS. 5 (I) to (V).

Main Input Routine (I)

FIG. 5 (A) shows a flow of the main input routine (1) which includes steps (I-1) to (I-4), the contents of which are mentioned below.

Figure 5A:
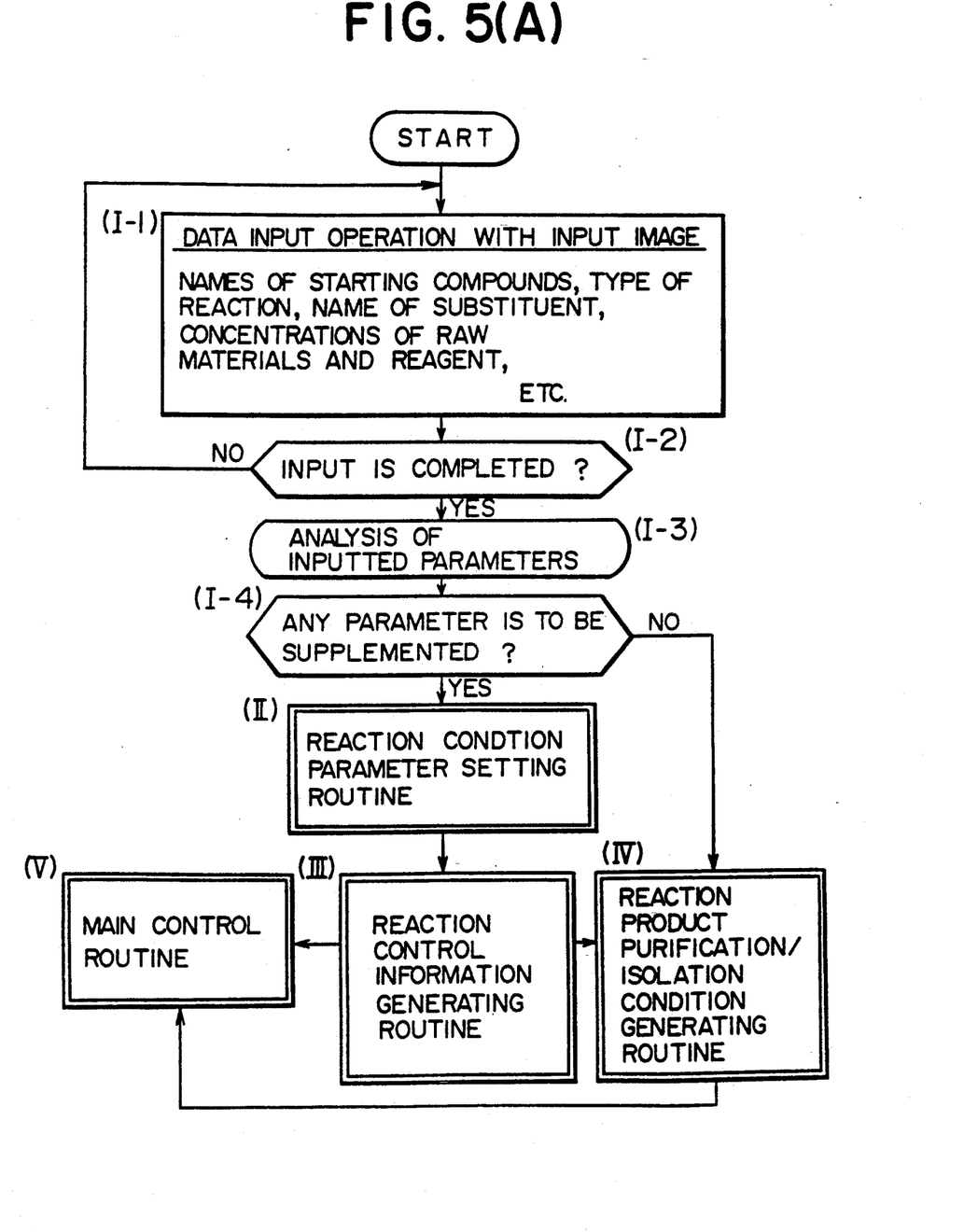
FIG. 5(A) is a flow chart of a main input routine.

At the step (I-1), the data input operation is executed while watching an input image. The input image is provided with prompting display regions for displaying various items prompting the input of the data required for performing the synthesis process and data input regions. In accordance with the input data items, there can be inputted various parameters such as, for example, names of raw material compounds, types of the reaction, names of substituents, names of reagents, concentrations of the raw material and the reagent, a control table, the sequence table and others in the data input regions. However, it is not always necessary to input the corresponding data in response to all the input data items being displayed. The data input may be spared for some of the items. Further, it is also possible to make use of the data inputted previously and stored in a file to thereby select the appropriate data or alternatively to utilize default values instead of the data inputting mentioned above. The input image may be constituted by a plurality of areas such as main input image areas and auxiliary input image areas.

At the step (I-2), the step (1-1) mentioned above is repeated until the end of the data input operation has been detected. The data inputted are stored.

At the step (I-3), the input data are analyzed to check whether the reaction condition parameters required for the synthesis process control of concern have completely been inputted or not.

At the step (I-4), when it is found that some of the reaction condition parameters are absent, the reaction condition parameter setting routine (II) is called to request for supplementation of the absent parameters. On the other hand, when all the reaction condition parameters as required have been inputted, a reaction product purification/isolation condition generating routine (IV) is then activated.

Reaction Condition Parameter Setting Routine (II)

FIG. 5 (B) shows a flow of the reaction condition parameter setting routine including steps (11-1) to (II-6), the contents of which are what follows.

Figure 5B:
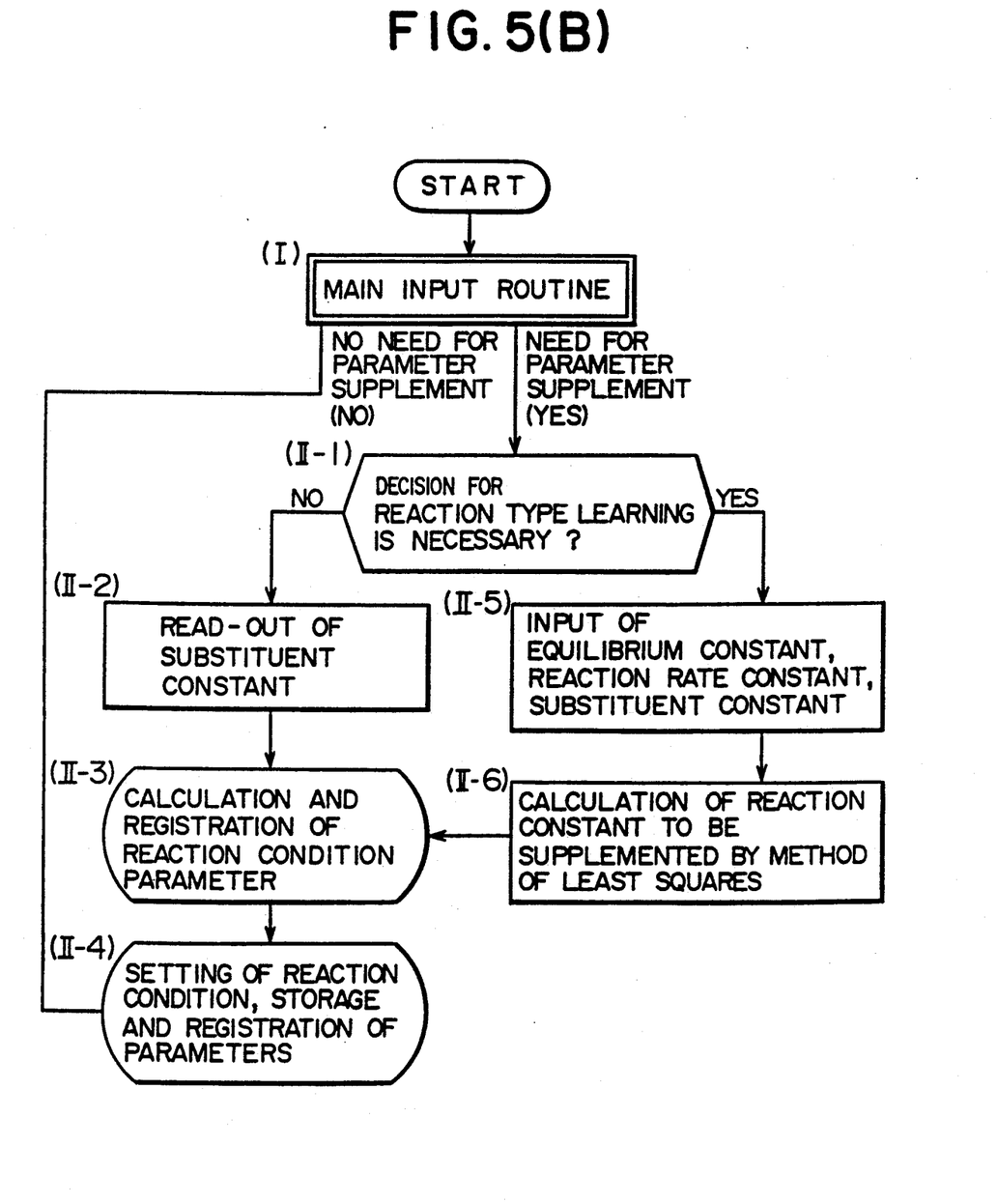
FIG. 5(B) is a flow chart of a reaction condition parameter setting routine.

At the step (II-1), a processing required for the supplementation of the reaction condition parameter as mentioned above is executed. At first, the reaction formula of concern is identified. When the required reaction constant is available from the data accumulated until then for the same type reaction formula as the identified one, the step (II-Z) is executed. On the other hand, if the reaction constant for the same type reaction formula is unavailable from the previously accumulated data, an inference has to be made. To this end, the step (II-5) for determining the reaction constant of concern is executed.

At the step (II-2), the stored substituent constant Es is read out.

At the step (II-3), the substituent constant Es is utilized for calculating the reaction condition parameters, i.e. the equilibrium constant K and the reaction rate constant $k_1$. Examples of the formulae for the calculation are given below:

$$K = 0.47 \exp(0.614\ Es/0.4343) \quad (6)$$

$$k_1 = 9.57 \exp(2.607\ Es/0.4343) \quad (7)$$

In the above expressions (6) and (7), the numerical values represent the reaction constants.

At the step (II-4), the inputted or calculated parameters for the reaction condition are set. The calculated reaction condition parameters are also registered as the learned data for storage in the file for the purpose of making it possible to utilize them in the future.

At the step (II-5), the equilibrium constants K, the reaction rate constant $k_1$ and the substituent constants Es for the reaction formula of concern are read out from the file storing the data for the known reaction formulae, for thereby determining the reaction constants for the reaction formula of concern.

At the step (11-6), the reaction constants and the substituent constants for the reaction formula of concern are calculated on the basis of distributions of K, $k_1$ and Es for the known reaction formula as read out by resorting to the method of least squares. The results of the calculation ar transferred to the step (II-3).

Reaction Control Information Generating Routine (111)

FIG. 5 (C) shows a flow of a reaction control information generating routine including steps (III-1) to (III-9), the contents of which are described below.

Figure 5C:
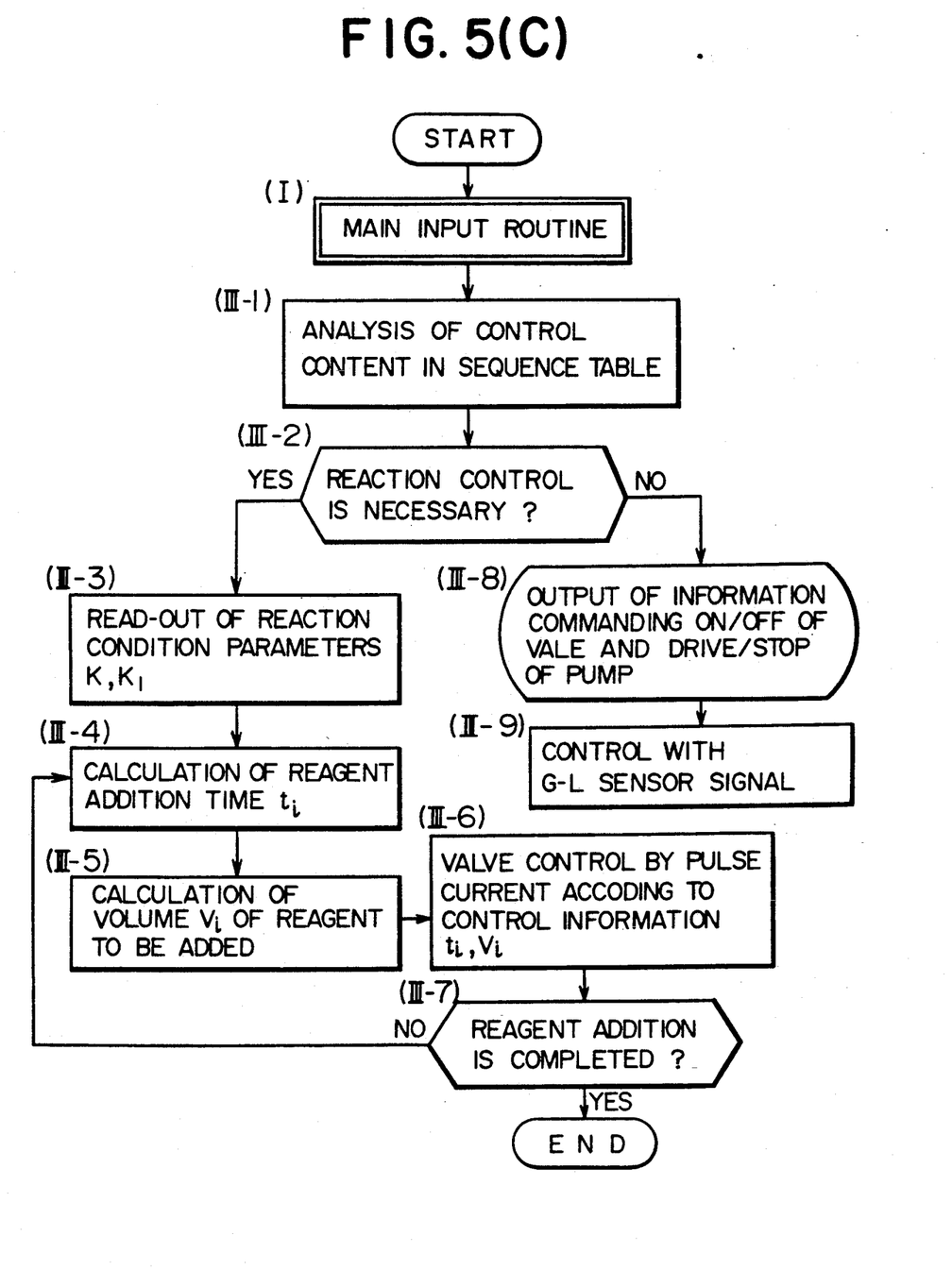
FIG. 5(C) is a flow chart of a reaction control information generating routine.

At the step (lII-1), the contents of control information stored in the sequence table created through the input procedure effected by the primary input routine (1) are analyzed for the sequential synthesis process steps.

At the step (111-2), a decision is made as to whether the reaction control is required at the process step to be next executed in the sequence table. If it is required, the step (III-3) is executed. Otherwise, the step (III-8) is executed.

At the step (III-3), the reaction condition parameters K and $k_1$ as set are read out.

At the step (III-4), the reagent addition time $t_i$ is calculated according to the expression (4) mentioned hereinbefore.

At the step (III-5), the volume $V_i$ of the reagent to be added is calculated in accordance with the expression (5) mentioned hereinbefore.

At the step (III-6), the opening/closing of the valve for addition of the reagent is controlled under pulse drive on the basis of $t_i$ and $V_i$ calculated.

At the step (III-7), the steps (III-4) to (III-6) are executed until the addition of the reagent has been completed.

At the step (III-8), when it is decided at the step (III-2) that the reaction control is unnecessary, other synthesis process control steps such as opening/closing (ON/OFF) of valves and start/stop of pumps a commanded are performed.

At the step (111-9), signal output from the G-L sensor is fetched for monitoring the status being currently controlled.

Reaction Product Purification/Isolation Condition Generating Routine (IV)

FIG. 5 (D) shows a flow of the reaction product purification/isolation condition generating routine including steps (IV-1) to (IV-13), the contents of which are described below.

Figure 5D:
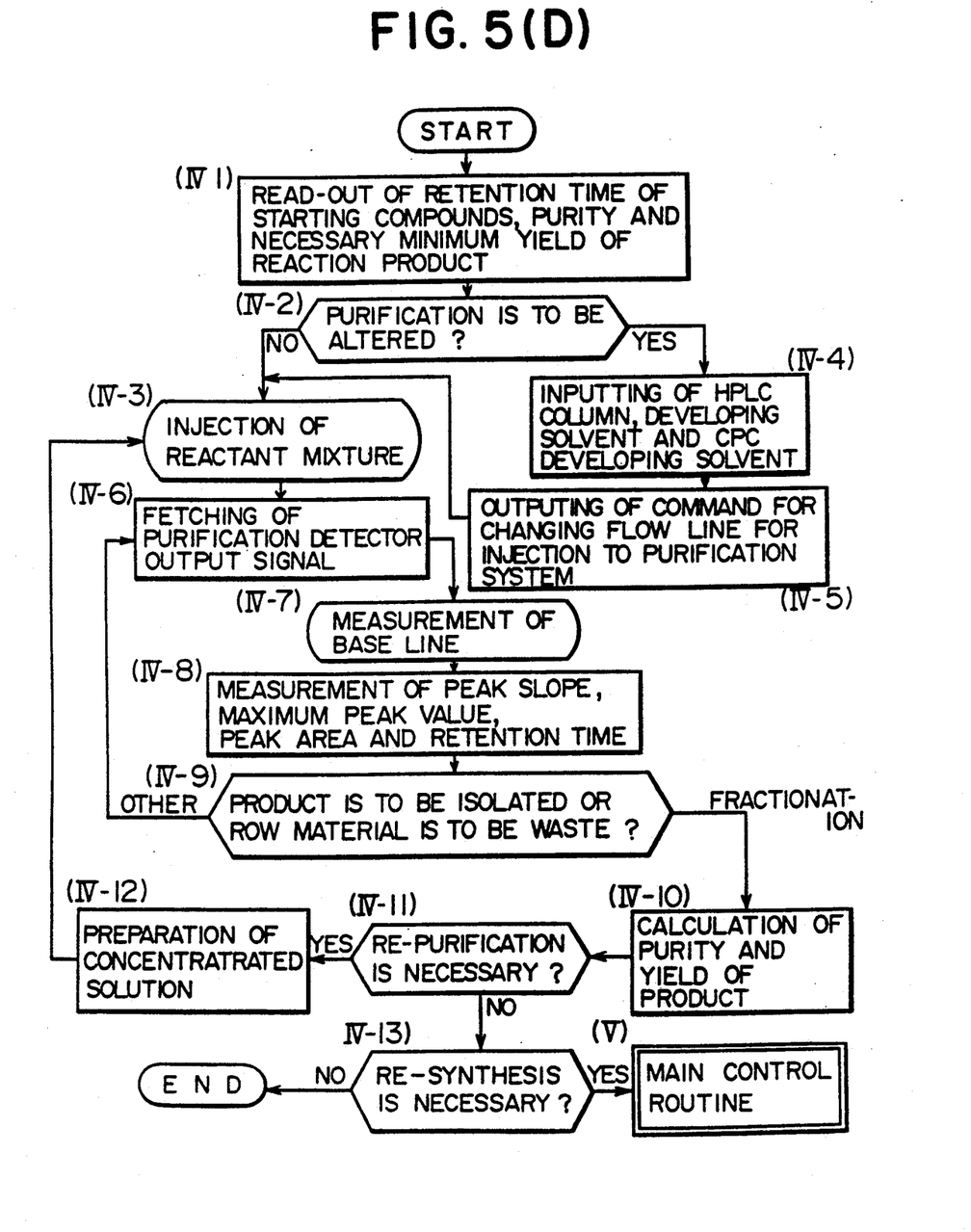
FIG. 5(D) is a flow chart of a reaction product purification and isolation condition generating routine.

At the step (IV-1), the retention time of the raw material compounds, the purity of the reaction product and the minimum yield to be assured set at the respective derived values are read out.

At the step (IV-2), a decision is made as to whether the purification process is to be altered or not. If it is unnecessary, the step (IV-3) is executed. Otherwise, the step (IV-4) is executed.

At the step (IV-3), a mixture resulting from the reaction is injected.

At the step (IV-4), data of the HPLC column, developing solvent and the CPC developing solvent are inputted.

At the step (IV-5), the flow lines for the injection into the purification system are changed.

At the step (IV-6), signals from the detectors of the purification system are fetched.

At the step (IV-7), the base line (reference point) is measured.

At the step (IV-8), the slope of the peak, the maximum peak value, the peak area and the retention time are measured, respectively.

At the step (IV-9), a decision is made as to the possibility of isolated extraction of the product or wastage of the raw materials. In case the isolated extraction is to be performed, the step (IV-10) is executed. Otherwise, the step (IV-6) is resumed.

At the step (IV-10), the purity and the yield of the product are calculated.

At the step (IV-11), through comparison with the desired purity, a decision is made as to whether re-purification is necessary or not. In case the re-purification is necessary, the step (IV-12) is executed. Otherwise, the step (IV-13) is executed.

At the step (IV-12), through comparison with the desired yield, a decision is made as to whether or not the re-synthesis is required. If it is necessary, the main control routine (V) is executed. Otherwise, the processing comes to an end.

Main Control Routine (V)

FIG. 5 (E) shows a flow of main control routine including steps (V-1) to (V-15), the contents of which are described below. In this conjunction, it is assumed that the names of the raw materials, reagents and solvents, the reservoir identification numbers, the necessity or non-necessity of the extraction process, command for the concentration process, and the necessity or non-necessity of the pH-adjustment of the solution as well as the pH-value have been inputted already through the main input routine (I).

Figure 5E:
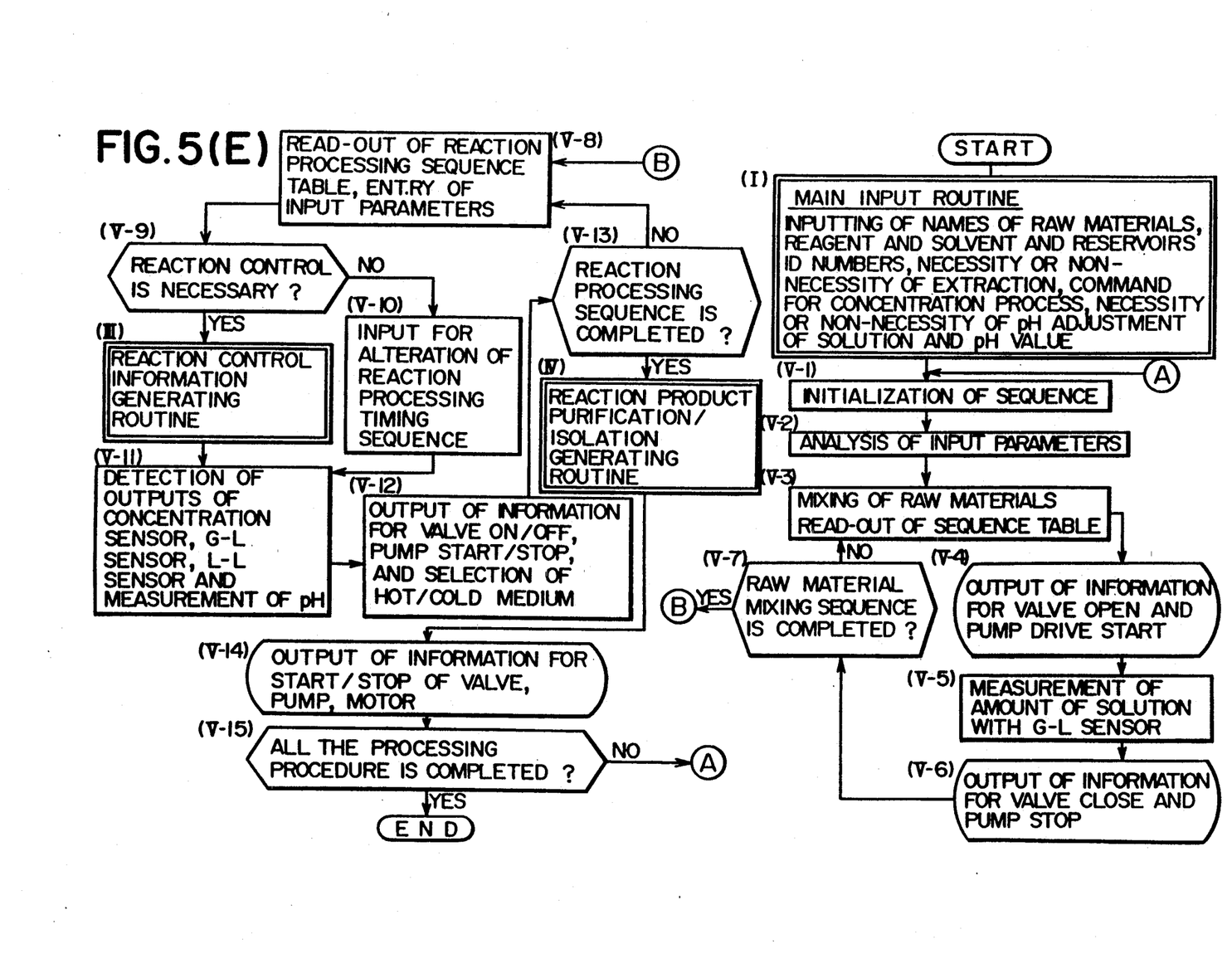
FIG. 5(E) is a flow chart of a main control routine.

At the step (V-1), initialization of the sequence is performed and a proper sequence table (e.g. one shown in FIG. 3) is set.

At the step (V-2), various parameters inputted through the routine (1) are analyzed.

At the step (V-3), the first process step in the sequence table is read out for commanding a raw material mixing (supplying) sequence.

At the step (V-4), information commanding the valve opening and the pump start is outputted.

At the step (V-5), the signal outputted from the G-L sensor is fetched to measure the amount of the injected solution.

At the step (V-6), information commanding the valve close and the pump stop is outputted.

At the step (V-7), a decision is made as to whether the raw material mixing sequence has been completed or not.

At the step (V-8), the next process step in the sequence table is read out for indicating the reaction process.

At the step (V-9), a decision is made as to the necessity or lack of necessity of the reaction control. When the reaction control is necessary, the reaction control information generating routine (III) is activated. When it is unnecessary the step (V-10) is executed.

At the step (V-10), the reaction process time sequence is altered by the input operation.

At the step (V-11) the signals outputted from the concentration sensor, G-L sensor and the L-L sensor are fetched to perform the pH-measurement and decision as to the propriety thereof.

At the step (V-12), the result of the decision is checked to output the information commanding the opening/closing of valves, start/stop of pumps and selection of the cooling/heating medium.

At the step (V-13), a decision is made as to the completion of the reaction process sequence. If it is not yet completed, the step (V-8) is resumed. When completed, the reaction product purification/isolation condition generating routine (IV) is activated.

At the step (V-14), the information commanding the drive or stop of the valves, pumps and the motors for the purification/isolation is outputted.

At the step (V-15), it is decided whether or not all the processing operations have been completed. If so, the synthesis process is finished. If not completed, the step (V-1) is regained.

As will be appreciated from the foregoing description, according to the present invention, the control information for performing a given synthesis reaction is automatically generated for the optimum reaction conditions simply by inputting the predetermined constant data for the given synthesis reaction at the start thereof, whereby the synthesis reaction can be executed automatically. Thus, there can be attained a high run efficiency while mitigating significantly the burden on the operator, which is very advantageous particularly when a wide variety of synthesis reaction processes have to be frequently carried out.

While particular embodiments of the invention have been shown and described, various modifications are within the true spirit and scope of the invention. The appended claims are, therefore, intended to cover such modifications.

We claim:

1. A method of manufacturing a desired chemical product from a chemical reaction between a raw material mixture and a reagent, the method comprising the steps of:

measuring an initial concentration ratio of the raw material mixture; and adding a variable volume of reagent to said raw material mixture at discrete time intervals, a first time interval being t., and being determined by the formula $$t_o = \frac{\sqrt{K}}{2Ak_1} \ln \frac{1}{1 + \sqrt{K}} \left( \frac{1+\alpha}{1-\alpha} + \sqrt{K} \right) \quad (1)$$

where $k_1$ represents a reaction rate constant, $K$ represents an equilibrium constant, $A$ represents said initial concentration of the raw material mixture, $\alpha$ represents a ratio of concentration of an intermediate product to a theoretical equilibrium concentration, and subsequent time intervals being determined by the formula $$t_i = \frac{\sqrt{K}}{2Ak_1} \left( \frac{1 + \sqrt{K}}{1 + (1-\alpha)\sqrt{K}} \right)^i \quad (2)$$

$$\left( 1 + \frac{\sum_{i=1}^{n} V_i}{V_o} \right) \ln \frac{1}{1 + \sqrt{K}}$$

$$\left( \frac{1+\alpha}{1-\alpha} + \sqrt{K} \right)$$

where $i$ is incremented after each time interval, said volume of reagent being determined by the formula $$V_i = \frac{\beta A V_o}{y} \left( \frac{\alpha \sqrt{K}}{1 + \sqrt{K}} \right) \left( 1 - \frac{\alpha \sqrt{K}}{1 + \sqrt{K}} \right)^{i-1} \quad (3)$$

where

V represents a volume of the raw material mixture at a start of the reaction, $V_i$ represents volumes of the reagent added at the time points $t_i$, respectively, $\beta$ represents a stoichiometrical ratio between the reagent and an intermediate product, and y represents a concentration of the reagent.

2. A chemical product manufacturing method set forth in claim 1, wherein said reaction rate constant ($k_1$) and said equilibrium constant (K) are determined on the basis of a substitute constant ($E_2$) in the following formulas:

$$k_1 = A \exp(B \cdot E_s)$$

$$K = C \exp(D \cdot E_s)$$

where A, B, C and D represent constants specific to said reaction.

3. A chemical product manufacturing method set forth in claim 1, wherein data of said time points ($t_o$, $t_i$) and said amounts ($V_i$), calculated by said expressions (1), (2) and (3), are stored together with information identifying said reaction in a memory of a computerized controller for reuse in carrying out another reaction.

4. A chemical product manufacturing method set forth in claim 1, wherein different types of reagents are added at several ones of said discrete time intervals, respectively.

5. An automated synthesis system for manufacturing a desired chemical product from a chemical reaction between a raw material mixture and a reagent, the system comprising:

synthesis processing means for containing the raw material mixture, dispensing a variable amount of the reagent at discrete time intervals, purifying the raw material mixture, and extracting the desired chemical product; and synthesis control means for determining a volume of said variable amount of the reagent dispensed by said synthesis processing means and for determining said time intervals for said dispensing of the reagent, a first time interval being $t_o$, and being determined by the formula $$t_o = \frac{\sqrt{K}}{2Ak_1} \ln \frac{1}{1+\sqrt{K}} \left( \frac{1+\alpha}{1-\alpha} + \sqrt{K} \right) \tag{1}$$

where $k_1$ represents a reaction rate constant,

K represents an equilibrium constant,

A represent said initial concentration of the raw material mixture, $\alpha$ represent a ratio of concentration of an intermediate product to a theoretical equilibrium concentration, and subsequent time intervals being determined by the formula $$t_i = \frac{\sqrt{K}}{2Ak_1} \left( \frac{1+\sqrt{K}}{1+(1-\alpha)\sqrt{K}} \right)^i \tag{2}$$

-continued $$\left(1 + \frac{\sum_{i=1}^{n} V_i}{V_o}\right) \ln \frac{1}{1+\sqrt{K}}$$

$$\left(\frac{1+\alpha}{1-\alpha} + \sqrt{K}\right)$$

where is incremented after each time interval, said volume of reagent being determined by the formula $$V_i = \frac{\beta A V_o}{y} \left( \frac{\alpha \sqrt{K}}{1+\sqrt{K}} \right) \left( 1 - \frac{\alpha \sqrt{K}}{1+\sqrt{K}} \right)^{i-1} \tag{3}$$

where $V_{2o}$ represents a volume of the raw material mixture at a start of the chemical reaction, $V_i$ represents volumes of the reagent added at time points $t_i$, respectively, $\beta$ represents a stoichiometrical ratio between the reagent and an intermediate product, and y represents a concentration of the reagent.

6. An automated synthesis system as set forth in claim 5, wherein:

said reaction rate constant ($k_1$) and said equilibrium constant (K) are determined in said synthesis control means on the basis of a substitute constant ($E_s$) by the following formulas, $$k_1 = A \exp(B_1 \cdot E_s)$$

$$K = C \exp(D \cdot E_s)$$

where A, B, C and D represent constants specific to said reaction.

7. An automated synthesis system as set forth in claim 5, wherein:

said time intervals ($t_o$, $t_i$) and said variable volumes ($V_i$) calculated by said formulas (1), (2) and (3) and are stored together with information identifying said reaction in a memory of said synthesis control means for reuse in controlling said dispensing of said reagent when carrying out a same synthesis reaction, said synthesis control means controlling the chemical reaction.

8. An automated synthesis system as set forth in claim 5, wherein:

different types of reagents are added by said synthesis control means at several ones of said discrete time intervals, respectively.

9. An automated compound synthesizing apparatus for producing a desired product through a series of synthesis processes, the apparatus comprising:

a synthesis reaction unit;

means for charging a mixture of raw materials and a solvent to said synthesis reaction unit and forming an intermediate product from said raw materials, said intermediate product being in an equilibrium state with said raw materials;

reagent adding means for adding a reagent to said mixture within said synthesis reaction unit, said reagent reacting with said intermediate product to produce the desired product;

means for determining an amount of said mixture of raw materials prior to said adding of said reagent;

means for determining an initial concentration of said raw material in said synthesis reaction unit;

means for determining an initial concentration of said intermediate product in said synthesis reaction unit;

means for determining a ratio of said concentration of said intermediate product to a theoretical equilibrium concentration;

means for determining a stoichiometrical ratio between said reagent and said intermediate product;

means for determining a concentration of said reagent;

computer-based synthesis control means for controlling said reagent adding means such that said reagent is successively added at discrete time intervals and in volumes described by the following formulas $$t_o = \frac{\sqrt{K}}{2Ak_1} \ln \frac{1}{1+\sqrt{K}} \left( \frac{1+\alpha}{1-\alpha} + \sqrt{K} \right) \quad (1)$$

$$t_i = \frac{\sqrt{K}}{2Ak_1} \left( \frac{1+\sqrt{K}}{1+(1-\alpha)\sqrt{K}} \right)^i \quad (2)$$

$$\left(1 + \frac{\sum_{i=1}^{n} V_i}{V_o}\right) \ln \frac{1}{1+\sqrt{K}} \left( \frac{1+\alpha}{1-\alpha} + \sqrt{K} \right)$$

$$V_i = \frac{\beta A V_o}{y} \left( \frac{\alpha \sqrt{K}}{1+\sqrt{K}} \right) \left( 1 - \frac{\alpha \sqrt{K}}{1+\sqrt{K}} \right)^{i-1} \quad (3)$$

where
$t_o$ represents a time duration fulfilled before said reagent is initially added,
$t_i$ represents said discrete time intervals at which said reagent is to be adding after said time duration $t_o$ is fulfilled,
$V\cdot$ represents said volume of the raw material mixture before said reagent is initially added,
$V_i$ represents said volumes of the reagent added at time intervals $t_i$, respectively,
$k_1$ represents a reaction rate constant specific to said reaction,
$K$ represents an equilibrium constant specific to said reaction,
$A$ represents said initial concentration of the raw material mixture,
$\alpha$ represents said ratio of concentration of said intermediate product to said theoretical equilibrium concentration,
$\beta$ represents said stoichiometrical ratio between said reagent and said intermediate product, and
$y$ represents said concentration of said reagent.

10. An apparatus as set forth in claim 9, wherein:
said means for determining an initial concentration of said raw material in said synthesis reaction unit, and said means for determining an initial concentration of said intermediate product in said synthesis reaction unit, include a concentration sensor; and
said synthesis reaction unit include a gas-liquid boundary sensor and a liquid-liquid boundary sensor;

11. A method of manufacturing a desired chemical comprising the steps of:
providing a synthesis reaction unit;
adding a plurality of raw materials to the synthesis reaction unit;
combining the plurality of raw materials in the synthesis reaction unit to form an intermediate product;
measuring an initial volume of the plurality of raw materials;
measuring an initial concentration ratio of the plurality of raw materials;
measuring a concentration ratio of the intermediate product;
determining a ratio of said concentration of said intermediate product to a theoretical equilibrium concentration;
determining a stoichiometrical ratio between a reagent and said intermediate product;
determining a concentration of said reagent;
adding a variable volume of said reagent to the synthesis reaction unit at discrete time intervals, a first time interval being $t\cdot$, and being determined by the formula $$t_o = \frac{\sqrt{K}}{2Ak_1} \ln \frac{1}{1+\sqrt{K}} \left( \frac{1+\alpha}{1-\alpha} + \sqrt{K} \right) \quad (1)$$

where
$k_1$ represents a reaction rate constant,
$K$ represents an equilibrium constant specific to said reaction,
$A$ represents said initial concentration of the raw materials,
$\alpha$ represents said ratio of concentration of the intermediate product to said theoretical equilibrium concentration,
and subsequent time intervals being determined by the formula $$t_i = \frac{\sqrt{K}}{2Ak_1} \left( \frac{1+\sqrt{K}}{1+(1-\alpha)\sqrt{K}} \right)^i \quad (2)$$

$$\left(1 + \frac{\sum_{i=1}^{n} V_i}{V_o}\right) \ln \frac{1}{1+\sqrt{K}}$$

$$\left( \frac{1+\alpha}{1-\alpha} + \sqrt{K} \right)$$

where i is incremented after each time interval, said volume of reagent being determined by the formula $$V_i = \frac{\beta A V_o}{y} \left( \frac{\alpha \sqrt{K}}{1+\sqrt{K}} \right) \left( 1 - \frac{\alpha \sqrt{K}}{1+\sqrt{K}} \right)^{i-1} \quad (3)$$

where
$V\cdot$ represents said initial volume of the plurality of raw materials,
$V_i$ represents volumes of the reagent added at the time points $t_i$, respectively,
represents said stoichiometrical ratio between the reagent and the intermediate product, and
represents said concentration of the reagent;
combining said reagent and said intermediate product in said synthesis reaction unit to react and form the desired chemical;
purifying the desired chemical; and
extracting the desired chemical.

* * * * *